July 15, 1941.  L. A. JOHNSON  2,249,141
FLUID SEAL
Filed April 14, 1936
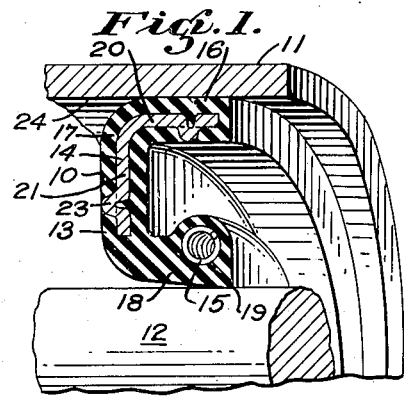
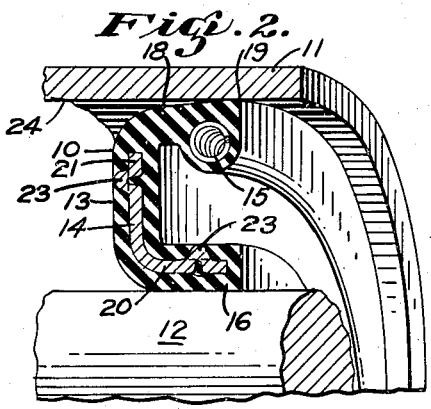
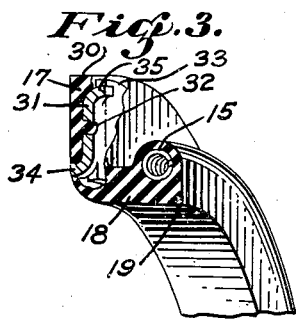
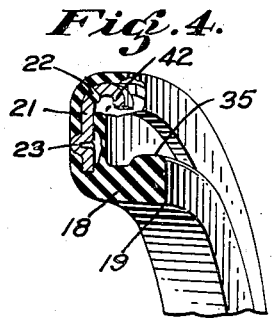
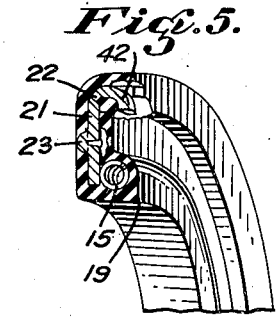
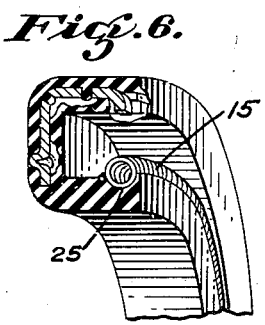
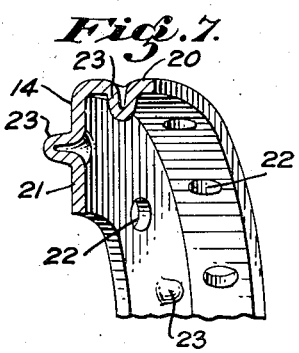
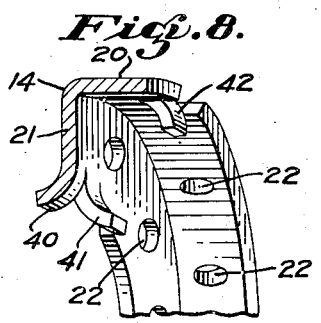
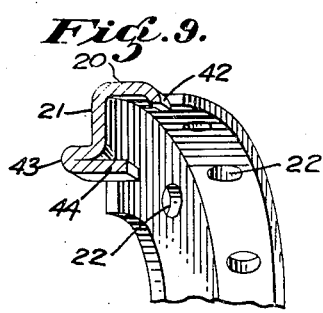
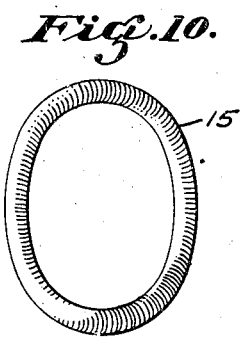
INVENTOR.
LLOYD A. JOHNSON
BY
ATTORNEY Patented July 15, 1941

2,249,141

UNITED STATES PATENT OFFICE 2,249,141

FLUID SEAL

Lloyd A. Johnson, Hillsborough, Calif., assignor to National Oil Seal Co., Oakland, Calif., a corporation of Nevada Application April 14, 1936, Serial No. 74,357

10 Claims. (Cl. 288—3)

My invention relates to improvements in fluid seals.

The principal object of my invention is to provide a seal of novel construction which will function efficiently for the purpose intended; to provide a seal made from a moldable, homogeneous mass with means embedded therein for maintaining the sealing device in operative shape independently of any rigidity or lack of rigidity in said moldable material and having a shell of rigid material embedded therein, which shell functions to stiffen the device, to control the shrinkage due to heat changes, to hold the sealing device to a positive contour or shape, to assure a permanent fit when inserted in the housing, regardless of any tendency for said moldable material to contract or expand when subjected to operating conditions, and to support the radial flange of said sealing device and thereby control any axial movement of the sealing lip; to provide a fluid seal of moldable material having the spring on the sealing lip embedded in said material thereby protecting it against attack of material being sealed and minimizing the centrifugal force effect on the spring in installations where the device is mounted in a rotating housing; to provide a self-contained type fluid seal having a resilient outer periphery rendering it easily conformable to establish a leak-tight fit with surfaces which are not highly finished and may be pitted or grooved whether inserted undersize and expanded between two flanges or inserted oversize with a press fit; and to provide a fluid seal having a resilient outer surface and a rigid inner core which permits said sealing device to be inserted in a housing by light pressure and which, when inserted, will remain in operative, non-rotative position due to the compression of the outer resilient coating upon insertion.

Broadly speaking, the principal object of my invention is to provide a fluid seal of moldable resilient material, having an inside rigid continuous core. Several different forms of the invention are presented herein for the purpose of exemplification but it will of course be understood that the invention is susceptible of embodiment in other structurally modified forms coming equally within the scope of the claims.

In the accompanying drawing:

Fig. 1 is a diametric section partly in perspective of a fluid seal and a housing, showing the seal positioned within the housing and sealing a rotating shaft;

Fig. 2 is a similar view of my fluid seal positioned on a rotating shaft and sealing against the housing bore;

Fig. 3 is a diametric section, partly in perspective, of a modified form of a fluid sealing member;

Fig. 4 is a similar view of another form of my fluid seal;

Fig. 5 is a similar view of another form of the fluid seal; and

Fig. 6 shows a seal similar to Fig. 1 except that the spring is not embedded in the sealing lip.

Fig. 7 is a view in perspective of one form of the rigid continuous ring member;

Fig. 8 is a similar view of another form of said ring member;

Fig. 9 is a similar view of still another form of said ring member; and

Fig. 10 is a similar view of one form of spring.

In Fig. 1, the seal is shown in a typical operating environment. In this case the seal, generally designated by the numeral 10, is secured inside a housing 11 with a non-rotating fit. This fit is usually what is known as a radial pressure fit, that is, the seal 10 is maintained in a non-rotative position in the housing by means of the outward pressure bearing against the inside of the housing. How this pressure is obtained in the present seal will be explained as this description proceeds. 12 designates the usual shaft projecting from inside the housing 11. The function of the seal 10 is to confine whatever lubricant or fluid content may be in the housing, and to prevent the fluid from escaping either along the shaft 12 or at the outer periphery of the seal 10 between it and the inside wall 24 of the housing.

The fluid seal 10, shown in Fig. 1, includes the body portion 13, the rigid continuous embedded member 14, and the helical spring 15.

The body 13 of the seal is molded into an annular ring, generally C shaped in cross-section. The body has the cylindrical portion 16 which is adapted for fluid-tight association with the inner wall 24 of the housing 11, a radial portion 17 and a resilient lip portion 18 terminating in the sealing lip or edge 19. The body 13 is molded from material such as Duprene, Thiokol, rubber, resinous, or other similar material, possessing the characteristics necessary to resist any deleterious action by the fluid being sealed in the housing by temperature conditions which exist during operation and by friction conditions created at the point of contact between the sealing lip 19 and the shaft 12.

I contemplate that in certain types of installations the cylindrical portion 16 and possibly the radial portion 17 will be molded of a material having less resiliency than the sealing portion 18. The degree of resiliency in the several parts can be regulated to suit the particular installation and to supply the characteristics needed. For instance, in installations where there is imparted to the seal 10 by the shaft 12 a considerable rotative force, it will be advisable to employ a less resilient material for the cylindrical portion 16.

The same would hold true where there is considerable force built up by the fluid being sealed which would tend to push the seal 10 along the housing bore 24. And, likewise, where shaft 12 is a reciprocating type as distinguished from the rotating type; that is, where the shaft 12 has a reciprocatory movement.

The rigid continuous ring member 14 which I embed in the body 13 may be composed of metal, plastic composition, or similar material. In the construction shown in Figs. 1 and 7, this ring 14 comprises the cylindrical axially extending portion 20 and the radially extending portion 21. I prefer to have perforations 22 in the axial and radial portions. These are formed in the ring member before it is set in the mold, and function to strengthen and unite the moldable material about the ring member. Also, I prefer to provide this ring with means to position it properly in the molding die, although these perforations 22 may cooperate with pins set in said mold for this purpose. The projections 23 on this ring (see Figs. 1 and 7) serve this purpose well. Usually three are provided on each face of the radial flange 21 and three on the inside of cylindrical portion 20. By omitting them on the outside of said cylindrical portion 20, the resilient action of pliant portion 16 is not interfered with and the seal can be forced into a housing bore without any portion of the ring or of said projections contacting said bore.

By completely embedding the ring member in the moldable material I may employ less expensive material for the ring member than with the present day type of metal cage fluid seal; for instance, it is not necessary to use brass when making a seal for use in a water pump. This lowers appreciably the cost of manufacturing the seal.

Instead of a single band to form the cylindrical portion 20, I may employ a continuous piece of material with overlapped ends, the important consideration being to provide a generally continuous support member underlying the resilient cylindrical body portion 16. By continuous I mean through substantially 360°. The radial portion 21 may be a separate flat washer.

In Fig. 8, the ring 14 is shown with tongues 40 and 41 struck out from the radial wall 21 and adapted to space ring 14 in the mold. The tongue 42 bent in from the cylindrical portion 20 cares for the radial positioning of ring 14 in the mold. As with the projections 23, there may be three or more of each set of tongues. In Fig. 9 the ring 14 has the tongues 42 in the cylindrical portion 20. The radial wall 21 is slitted and each tongue bent on itself to form the knee 43 and foot 44.

The presence of the rigid continuous ring member embedded in the moldable material gives to the completed seal a rigidity and strength requisite in such a device. In addition, the rigid continuous ring member 14 controls the amount of shrinkage of the rubber or composition of the body 13 when it is removed from the mold. Where the cylindrical portion 16 of the body 13 is made of a less resilient composition the ring 14, being rigid, holds the body portion 13 to a concentric shape as it cools. The cylindrical axially extending portion 20 of the rigid continuous ring 14 also serves to back up the cylindrical portion 16 of the body 13, and to give it the necessary backing so that it can exert the necessary outward radial pressure to accomplish a radial pressure fit against the inside wall 24 of the housing 11.

For a given resiliency of rubber or composition to be employed in the cylindrical portion 16 and a given rotative effect imparted to the seal by the shaft 12, there will be required a certain excess of thickness between the outer peripheral surface of the axial portion 20 and the inner wall 24 of the housing. In other words, the outside diameter of the seal body taken between opposite cylindrical walls 16 will be greater than the inside diameter of the housing bore 24. Thus, when the seal is inserted in the housing 11 the resilient body material between the cylindrical wall 16 and the outer peripheral wall 20 of ring 14 will be crowded together or placed under a compressive strain. The tightness of the fit of the seal in the housing bore 24 can be regulated therefore by the thickness given to the rubber or composition lying between the outer periphery of the cylindrical portion 20 of the ring member 14, and the cylindrical wall 16 of the body 13.

In those installations where the sealing unit 10 is subject to considerable variation in temperature the ring 14 serves to limit and control the amount of expansion or contraction of the whole body member 13, and particularly the radial portion 21. This avoids the trouble sometimes encountered from the inward movement of the radial body portion 17 of the sealing member until it contacts with the shaft 12 and causes undue friction, with resultant heat and its deleterious effects.

Another important result from having the ring member 21 set in the radial wall 17 of the body 13 is that it controls the axial shifting of the sealing portion 18 and serves to resist any tendency of the sealing lip to be "blown out" or pushed through into a non-sealing position, due to force exerted by the contents being sealed in the housing.

In this preferred embodiment the helical spring 15 is molded into the sealing portion 18, in a position above the sealing lip 19. Not only does this assure the fact that the contractive sealing effort of the spring 15 will be regulated and transmitted to the proper point on the sealing lip 19, but it also makes unnecessary the usual wall or metal housing member to hold the spring securely in position on the sealing lip and keep it from being removed. Another feature of this construction is that the spring may be made from a metal without regard to its susceptibility to attack from different materials being sealed because the spring 15 is completely embedded in the composition or rubber body 13. For example, a steel spring subject to attack by water causing it to rust may be used. This enables me to employ an inexpensive metal in making the spring whereas with the exposed type of spring it is often necessary to employ an expensive alloy metal.

As before stated, I have found that Duprene or Thiokol are satisfactory materials to use for molding the body 13. Thiokol is best for sealing water and Duprene is best for sealing oil. I contemplate that other similar types of materials may be used and do not intend hereby to limit my invention to the employment of these named materials, since they are mentioned merely to illustrate the invention.

Due to the co-action between the rigid continuous members' cylindrical portion 20 and the resilient rubber or composition 16 lying between it and the housing bore 24, I obtain a result heretofore unobtainable in these seals of the self-contained type, namely, the ability to press the seal into the bore with very light pressure and without the necessity of using a hydraulic press or other type of forcing means, such as is employed today with seals having a hard outer periphery 16.

This same resiliency and ability to conform easily to irregular surfaces effects economies for the machine manufacturers who use these fluid seals because the bore 24 of the housing does not require as accurate machining where there is not to be a metal to metal fit. With the present day commercial seal having a cold rolled steel cage the bore must be free of grooves or pits to have a leak-proof metal to metal joint. With my device a reasonable degree of roughness of the bore 24 is even helpful in anchoring the seal against rotation.

While I have shown the ring 14 (Fig. 7) as formed of a single stamping and continuous joined ring, I can employ a strip or band of metal or other material which may be overlapped to form a ring. Such a ring would accomplish the purposes of my invention and would have a slight advantage in certain cases by imparting additional resiliency or outward radial pressure to the resilient cylindrical portion 16 of the body 13. Where such a ring is employed the radial portion 21 could be a flat washer. Of course, the ring 14 may be a die casting of metal or formed from plastics.

The seal construction shown in Fig. 6 is substantially like that of Fig. 1 just described except that helical spring 15 is not embedded or molded into the sealing lip 18. Instead, a spring retaining groove 25 is formed in the lip 18 during the molding operation and is adapted to receive and retain the spring in operative position on the lip. Another modification would be to have the spring 15 partially covered with the moldable material during the molding operation.

The construction shown in Fig. 2 is again in all particulars like Fig. 1 and operates in a similar manner. It differs, however, in that the flexible sealing lip 18 bears against the bore 24 of the housing and not on the shaft 12 as in the case of Fig. 1. The helical spring 15, cast integral in the lip 18, is an expansive type, instead of being a contractive type of spring, and helps to urge the sealing lip 19 into firm engagement with the bore wall 24.

The rigid continuous ring member 14 in this case has its axially extending portion 20 on the inner side and in close proximity to the shaft 12. The axial portion 21 of the ring 14 functions in like manner as in Fig. 1. The ring 14 is molded into the body 13 and its axial portion 20 serves to back up or support the resilient inner peripheral portion 16 of the body member and to compress it between the shaft 12 and the ring portion 20.

In Fig. 3 I have shown a modified form of my seal, in which the elongated, cylindrical portion 20 of the other forms illustrated has been cut down to form the relatively narrow cylindrical portion 30. The sealing lip 18 and the helical spring 15 are identical with the structures already described. The rigid continuous ring member is comprised of a flat washer 31 having tongues 34 and 35 which space it axially in the mold and perforations 32 through which the moldable material flows during the forming of the seal and serves to tie the radial walls 17 to each other. The function of the radial washer 31 is like that of the radial portion 21 of the structure in Fig. 1.

The structure shown in Fig. 3 is designed for use in housings having a shoulder against which it is to lodge, or in installations where there is very little pressure exerted which would push the seal along the housing. As in the case of the structures already described, the resilient body portion lying between the surface 30 and the edge 33 of the washer 31 is placed under a resilient compressive strain and serves to form a leak-tight joint between the body 30 and the bore 24 of the housing, and also serves to anchor the seal against movement in the housing. Another use which can be made of the structure shown in Fig. 3 is where it is to be embodied in a sub-assembly. It is also adapted for use in the conventional type of oil seal having a soft cold-rolled steel outer cage such as shown in my Patent No. 2,031,956, dated February 25, 1936.

The structures shown in Figs. 4 and 5 are similar to the ones shown in Fig. 1 except that the proportions are altered slightly so that the seal will be adapted to fit in a shallower recess. This type of seal is particularly applicable for use in the front wheel hub of automobiles. In the structure of Fig. 4 I have found that it is possible to secure sufficient contractive effort on the sealing lip 19 by molding a rib 35 directly over the sealing lip 19. In the majority of installations this extra contractive resilient means gives the proper firm support to the sealing lip 19 to hold it on the shaft. The sealing portion 18 may or may not be shortened as shown in Fig. 4, its length depending upon the preference of the designer.

In Fig. 5 a like condition holds true and this structure differs from Fig. 4 in that the helical spring 15 has been set close to the bottom of washer 14, and the sealing lip 19 moved closer to the radial portion 21 by eliminating the sealing neck portion 18.

From the foregoing it will be understood that my invention provides an improved fluid seal preferably adapted for insertion in a housing having a smaller bore than the diameter of the seal, said seal comprising a unitary body portion made of moldable resilient material, having a resilient cylindrical peripheral portion and a flexible sealing lip, and a rigid continuous ring molded into and underlying the cylindrical peripheral body portion, which is adapted to compress this resilient peripheral portion between the ring and the bore of the housing thereby to secure the seal in a non-rotating operative position. In practice I have found that by making the outer periphery of the body portion of a fairly resilient material and backing it with this rigid ring, I am able to insert the seal into a housing with very light pressure. The radial pressure fit effected by compressing the peripheral portion has a much higher coefficient of friction than the sealing lip 19 contacting the shaft, therefore the seal is held securely in place.

The foregoing description sets forth the principles of my invention but I do not intend thereby to limit my invention to the details chosen for this description, except as required by the following claims. I contemplate that parts may be varied to suit the designers' choice but still will embody my invention.

What I claim is:

1. As an article of manufacture, a fluid seal adapted for insertion under peripheral compression to establish a self-sustaining leak-tight fit against the bore of an opening through which a shaft projects, comprising a rigid continuous flanged circular ring, a body portion of pliant moldable material molded around said ring so as to embed it completely therein and a depending pliant lip portion formed integral with said body portion and extending into sealing contact with said shaft.

2. As an article of manufacture, a fluid seal adapted for insertion under peripheral compression to establish a self-sustaining leak-tight fit against the bore of an opening through which a shaft projects, comprising a rigid continuous flanged circular ring, a body portion of pliant moldable material molded around said ring so as to embed it completely therein, a depending pliant lip portion formed integral with said body portion and extending into sealing contact with said shaft, and having a spring receiving groove formed therein during the molding thereof.

3. As an article of manufacture formed in a mold, a fluid seal adapted for insertion under peripheral compression to establish a self-sustaining leak-tight fit against the bore of an opening through which a shaft projects, comprising a rigid continuous circular ring, said ring having a radial wall and an axial wall, a body portion of pliant moldable material molded around said ring, said material which lies between the periphery of the axial wall of said ring and the outer periphery of said body portion being of substantially equal thickness whereby the peripheral compression thereof will support said ring substantially concentric with the bore of said opening, and a depending pliant lip portion formed integral with and joined to said body portion near the inner periphery of the radial wall of said ring, said lip portion extending into sealing contact with said shaft.

4. As an article of manufacture, a fluid seal adapted for insertion under peripheral compression to establish a self-sustaining leak-tight fit against the bore of an opening through which a shaft projects, comprising a rigid continuous circular ring, said ring having a radial wall and an axial wall, a body portion of pliant moldable material molded around said ring, said material which lies between the periphery of the axial wall of said ring and the outer periphery of said body portion being of substantially equal thickness whereby the peripheral compression thereof will support said ring substantially concentric with the bore of said opening, a depending pliant lip portion formed integral with and joined to said body portion near the inner periphery of the radial wall of said ring, said lip portion extending into sealing contact with said shaft, and a helical spring embedded in said lip portion during the molding thereof.

5. As an article of manufacture, a fluid seal adapted for insertion under peripheral compression to establish a leak-tight fit against the bore of an opening through which a shaft projects, made of a rubber-like compound, molded around a rigid continuous flanged ring, and having a depending resilient lip portion to extend into sealing contact with said shaft, the body portion of said molded material around said ring and lying between it and the outer periphery of the seal being less resilient than said lip portion.

6. As an article of manufacture, a fluid seal adapted for insertion in a housing having a smaller bore than the diameter of said seal, comprising a unitary body portion made of moldable resilient material having a cylindrical peripheral portion, a hole in its center through which a shaft may be extended, and a flexible sealing lip, and a rigid continuous flanged ring underlying said cylindrical peripheral body portion, the axial portion thereof being adapted to compress said last-named portion between said ring and said bore thereby securing said seal in a non-rotating operative position in said housing.

7. As an article of manufacture, a fluid seal adapted for insertion in a housing having a smaller bore than the diameter of said seal, comprising a unitary body portion made of moldable resilient material having a cylindrical peripheral portion, a hole in its center through which a shaft may be extended, and a flexible sealing lip, and a rigid continuous flanged ring underlying said cylindrical peripheral body portion, the axial portion thereof being adapted to compress said last-named portion between said ring and said bore thereby securing said seal in a non-rotating operative position in said housing, said resilient material being soft enough to be easily compressed whereby said fluid seal may be inserted in said bore by the pressure of the fingers or hand.

8. As an article of manufacture formed in a mold, a fluid seal body adapted for insertion under peripheral compression to establish a self-sustaining leak-tight fit against the bore of an opening through which a shaft projects and a lip portion in contact with said shaft, comprising a rigid continuous circular ring, said ring having a radial wall and an axial wall, the radial wall extending inwardly toward said shaft being spaced therefrom a less distance than the thickness of the lip portion of the body, a body portion of pliant moldable material molded around said ring, said material which lies between the periphery of the axial wall of said ring and the outer periphery of said body portion being of substantially equal thickness whereby the peripheral compression thereof will support said ring substantially concentric with the bore of said opening, and a depending pliant lip portion formed integral with and joined to said body portion near the inner periphery of the radial wall of said ring, said lip portion extending into sealing contact with said shaft.

9. As an article of manufacture, a fluid seal adapted for insertion in a housing having a smaller bore than the diameter of said seal, comprising a unitary body portion made of moldable resilient material having a cylindrical peripheral portion, a hole in its center through which a shaft may be extended, and a flexible sealing lip, and a rigid continuous flanged ring adapted to back up and support an axial portion of said body portion in compression with respect to the surface being sealed.

10. As an article of manufacture, a fluid seal adapted to seal the opening between two relatively moving substantially cylindrical surfaces, comprising a rigid continuous flanged circular ring, a body portion of pliant moldable material molded around said ring so as to embed it completely therein, and having a cylindrical sealing surface on both its inner periphery and its outer periphery, the axial portion of said ring being adapted to support one of said peripheral sealing portions of the body in sealing contact with its adjacent cylindrical surface, and the radial portion of said ring being adapted to support the other of said peripheral sealing portions of the body in sealing contact with the other surface being sealed.

LLOYD A. JOHNSON.